United States Patent [19]
Lewus

[11] Patent Number: 5,227,710
[45] Date of Patent: Jul. 13, 1993

[54] MULTIPLE SPEED SINGLE PHASE MOTOR

[75] Inventor: Alexander J. Lewus, Phoenix, Ariz.

[73] Assignee: The Alexander J. Lewus Revocable Inter Vivos (Living) Trust, Phoenix, Ariz.

[21] Appl. No.: 635,295

[22] Filed: Dec. 28, 1990

Related U.S. Application Data

[63] Continuation-in-part of Ser. No. 458,136, Dec. 28, 1989.

[51] Int. Cl.⁵ .............................................. H02P 1/44
[52] U.S. Cl. ...................... 318/781; 318/785; 318/794
[58] Field of Search ............... 318/796, 794, 795, 739, 318/785, 781

[56]         References Cited
      U.S. PATENT DOCUMENTS

| | | | |
|---|---|---|---|
| 1,780,881 | 11/1930 | Kennedy | 318/794 |
| 1,886,895 | 11/1932 | Myers | 318/794 |
| 1,961,793 | 6/1934 | Schaefer | 318/795 |
| 2,023,237 | 12/1935 | Morrill | 318/795 |
| 2,068,559 | 1/1937 | Michelsen | 318/795 |
| 4,794,288 | 12/1988 | Lewus | 318/794 |

*Primary Examiner*—William M. Shoop, Jr.
*Assistant Examiner*—John W. Cabeca
*Attorney, Agent, or Firm*—Thomas R. Vigil

[57]         ABSTRACT

A multiple speed alternating current motor is disclosed for operation from a source of single phase alternating current power. For high speed operation, first and second windings are supplied with operating power through a multiple position switch. These windings are electrically angularly displaced from one another by 90° on the stator core and are inductively coupled to the rotor of the motor. Maximum starting torque and maximum speed operation of the motor is provided in this condition of operation. When the switch is operated to a low speed position, the impedance of the second winding is increased.

7 Claims, 4 Drawing Sheets

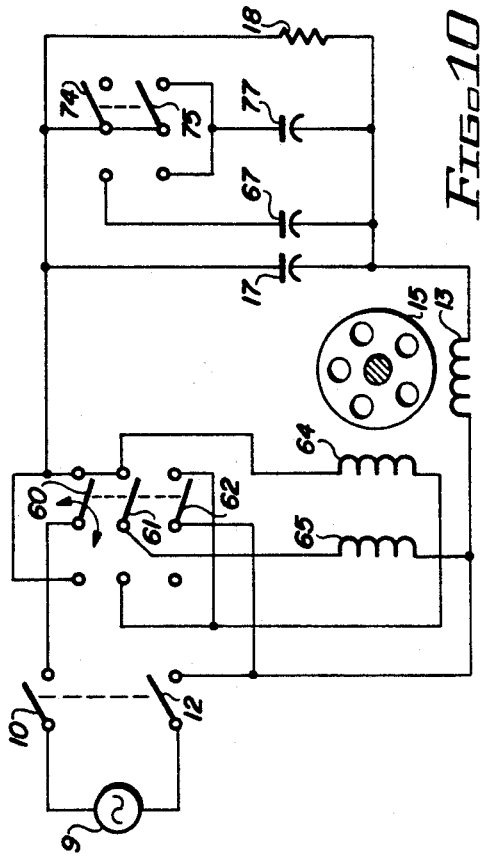

FIG. 10

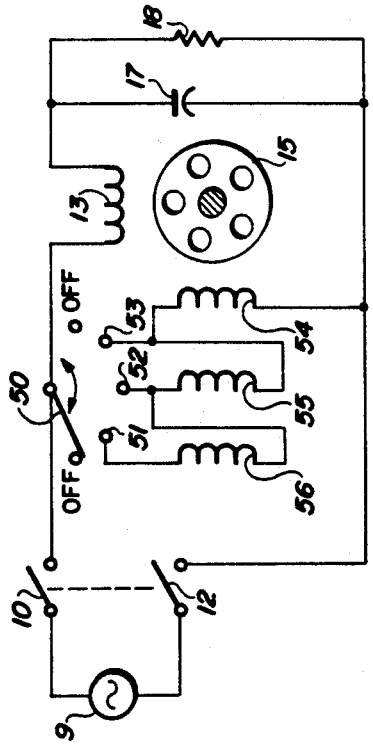

| SPEED SELECTOR SWITCHES | INPUT WATTS | | INPUT VOLTS | LINE AMPERES | | STARTING WINDING AMPERES | | RUNNING WINDING AMPERES | | CAPACITOR SIZE (MFD) | R.P.M. FULL LOAD | POWER FACTOR RUN FULL LOAD | TOTAL FULL LOAD WATTS INPUT RATED IN H.P. |
|---|---|---|---|---|---|---|---|---|---|---|---|---|---|
| 1 | START | 1080 | 120 | START | 9.5 | START | 10.5 | START | 4.0 | 80 | 1730 | 78 | .62 |
|   | RUN | 468 |   | RUN | 5.0 | RUN | .4 | RUN | 4.6 |   |   |   |   |
| 2 | START | 1080 | 120 | START | 9.5 | START | 10.5 | START | 3.0 | 60 | 1720 | 73 | .49 |
|   | RUN | 368 |   | RUN | 3.7 | RUN | 1.2 | RUN | 3.3 |   |   |   |   |
| 3 | START | 1080 | 120 | START | 9.3 | START | 9.5 | START | 3.0 | 30 | 1682 | 95 | .48 |
|   | RUN | 365 |   | RUN | 3.2 | RUN | 2.6 | RUN | 1.4 |   |   |   |   |
| 4 | START | 260 | 120 | START | 3.6 | START | 3.3 | START | 2.0 | 80 | 1300 | 60 | .34 |
|   | RUN | 260 |   | RUN | 3.6 | RUN | 1.3 | RUN | 3.7 |   |   |   |   |
| 5 | START | 240 | 120 | START | 2.5 | START | 2.0 | START | 2.3 | 60 | 1050 | 80 | .32 |
|   | RUN | 240 |   | RUN | 2.5 | RUN | 1.8 | RUN | 2.9 |   |   |   |   |
| 6 | START | 215 | 120 | START | 2.0 | START | 2.3 | START | 1.4 | 30 | 620 | 97 | .28 |
|   | RUN | 215 |   | RUN | 2.0 | RUN | 2.2 | RUN | 1.5 |   |   |   |   |

MULTIPLE SPEED SINGLE PHASE MOTOR

RELATED APPLICATION

This application is a continuation-in-part of co-pending application, Ser. No. 07/458,136, filed on Dec. 28, 1989.

BACKGROUND

Single phase alternating current electric motors conventionally are provided with two windings on a stator core. These windings are inductively coupled to the rotor of the motor. Such motors are widely used for various purposes and range in size from very small fractional horsepower motors on up to multiple horsepower sizes. Single phase motors are particularly popular, since most home and business alternating current supplies are in the form of single phase power.

Single phase electric motors include a stator core, which is wound with a start winding and a run winding connected to the source of operating power. These windings surround and are inductively coupled to a rotor which rotates a shaft to produce the motor output. Rotors are made in a number of different configurations, such as squirrel cage rotors, high resistance rotors, low resistance rotors, wound rotors, or multiple winding high and low resistance rotors. All of these configurations, along with various stator winding arrangements, are well known in the electric motor industry.

Typically, the start winding is made of relatively small diameter wire; and the run winding is made of equal or relatively large diameter wire, compared to the diameter of the start winding. These windings are physically and electrically angularly displaced from one another on the stator.

In conventional capacitor-start and capacitor-start/capacitor-run motors, a starting capacitor is connected in series with the starting winding and a switch. At motor start-up, the switch is closed and the capacitor, in conjunction with the relatively small diameter starting winding, produces a leading current in the starting winding which is approximately equal to, and approximately 90° displaced in phase from, the lagging current in the main or run winding of the motor. Such arrangements produce high values of starting torque.

Usually, a conventional capacitor-start motor has a centrifugal or thermal switch connected in series with the capacitor and start winding across the input terminals. The run winding is connected in parallel with this series-connected starting circuit. The starting condition is such that the instantaneous locked rotor current is high; and the motor starting current demand factor also is high. As a consequence, such motors undergo relatively high operating temperatures. Because the starting winding of such motors generally is a relatively small diameter wire, overheating can and frequently does occur. Such overheating results in a relatively limited life of the starting winding due to burnout, particularly under overload conditions of operation of the motor.

Applicant has developed capacitor-start/capacitor-run motors which do not use small diameter starting windings, but instead utilize two series-connected windings (of substantially the same diameter heavy wire) electrically phase displaced 90° from one another on the stator core.

Applicant's U.S. Pat. Nos. 4,734,601 and 4,772,814 disclose motors in which one of the windings has a capacitor connected in parallel with it to form a parallel resonant circuit at the operating frequency of the motor. These motors are high efficiency motors which overcome most of the disadvantages of the prior art capacitor-start/capacitor-run motors. The motors disclosed in both of these patents, however, have relatively low starting torque. Consequently, such motors primarily are suitable for use in situations which do not require very high starting torques, such as pumps, blowers, machine tools and many commercial and domestic appliances.

For situations where higher starting torques are required, a variation of the parallel resonant configuration has been developed. This is disclosed in applicant's U.S. Pat. No. 4,675,565. The motor disclosed in this patent also use a parallel resonant circuit at the operating frequency of the motor. In addition, however, a second capacitor is connected in series with a switch in parallel with the first capacitor. This switch is closed during start-up of the motor, and is opened during normal load conditions of operation of the motor. This permits a substantial increase in the starting torque of the motor. During normal operating or running conditions of the motor when the switch is opened, the parallel resonant circuit functions in the same manner as disclosed in the motors of U.S. Pat. Nos. 4,734,601 and 4,772,814.

Applicant also has developed a motor with improved starting torque which utilizes a series resonant circuit formed by the run winding and a capacitor having a high capacitance. The start winding is connected in parallel with the series connected run winding and capacitor. This system is disclosed in applicant's U.S. Pat. No. 4,794,288. During full load and no load running conditions of operation of the motor, the major portion of the current passes through the run winding and capacitor, with lower current (approximately 25% to 50%) flowing through the start winding.

All of the motors disclosed in the above-identified patents are designed for single speed operation. Multiple-speed single phase induction motors typically include internally connected motor switches in the form of centrifugal switches, relays, or the like. Such internally located switches frequently produce arching and additionally require space for accommodating such switches. The location of internally connected motor switches also subjects the switches and the mechanism for operating them to increased temperatures from the motor windings, particularly when the motor is operating under heavy load and start conditions.

Two prior art multiple-speed single phase induction motors, of the type mentioned above, are disclosed in the patents to Schaefer U.S. Pat No. 1,961,793 and Michelsen U.S. Pat. No. 2,068,559. Both of these patents disclose the use of centrifugal switches for disconnecting a relatively small-sized start winding from the operating circuit for the motor after the motor attains a pre-established running speed. In the motor disclosed in the Schaefer patent, the motor always is first started in its high-speed mode. After start-up has been effected and the centrifugal switch has removed the starting winding, an external selector switch which, can be operated to select either medium or low speed windings for the running operation of the motor. It is always necessary to start the motor in its high-speed mode.

In the motor disclosed in the Michelsen patent, the motor always must be started in its low-speed mode. After a minimum running speed has been attained, the centrifugal switch removes the starting winding from the circuit. The speed selection switch then can be moved to either an intermediate or high-speed winding for running the motor. In both Schaefer and Michelsen, the centrifugal switch is operated to remove the starting winding from the operating circuit of the motor once the operating speed of the motor has been attained.

Accordingly, it is desirable to provide a multiple speed induction motor of the general types described in the above-mentioned prior art patents which overcomes the disadvantages of such patents and which utilizes switching controls located externally of the stator rotor and the associated operating windings of the motor.

SUMMARY OF THE INVENTION

Accordingly, it is an object of this invention to provide an improved alternating current motor.

It is another object of this invention to provide an improved multiple-speed alternating current motor.

It is an additional object of this invention to provide an improved single-phase multiple-speed capacitor induction motor.

It is a further object of this invention to provide a multiple-speed alternating current motor in which the switches for controlling the motor speed are located externally of the stator and operating windings of the motor.

In accordance with a preferred embodiment of the invention, a multiple-speed single-phase alternating current motor includes a stator core and a rotor. First and second windings are electrically angularly displaced from one another substantially 90° on the stator core and they are inductively coupled to the rotor. A third winding also is wound on the stator core and inductively coupled to the rotor. A switch is provided with at least first and second states of operation and is coupled between a source of alternating current power and the windings. In the first state of operation, the switch interconnects the source of power to the first and second windings to operate the motor at a first speed. In the second state of operation the switch additionally interconnects the source of power to the third winding, or interconnects the second and third windings in a different configuration to operate the motor at a different speed.

Other variations of the multiple speed motor operate such that the switch varies the impedance or the capacitance of the motor between the two states of operation to cause different speeds of operation of the motor to occur.

BRIEF DESCRIPTION OF THE DRAWINGS

FIGS. 5-10 are schematic circuit diagrams of other preferred embodiments of six motors constructed according to the teachings of the present invention.

DETAILED DESCRIPTION

Reference now should be made to the drawings, where the same reference numbers are used in the different figures to designate the same or similar components.

Figure 1:
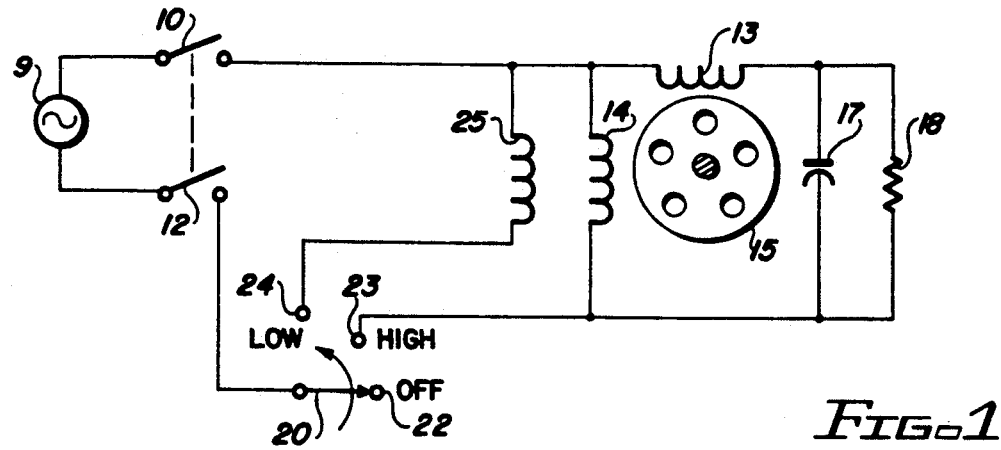
FIGS. 1-4 are schematic circuit diagrams of preferred embodiments of four motors constructed according to the teachings of the present invention.

FIG. 1 is a schematic diagram of a two speed motor operating as a capacitor-run motor in the high speed mode of operation thereof. In the circuit of FIG. 1, single phase alternating current power is supplied from a suitable source 9 through a double-pole single-throw switch 10/12. A run winding 13 is wound on the stator core (not shown) and is connected in series with a run capacitor 17 to the switch 10/12 through contacts 20, 23 of a three position switch in the high speed mode of operation of the motor. A start winding 14 is connected in parallel with the winding 13 and capacitor 17. The stator on which the windings 13 and 14 are placed surrounds a rotor 15, so that inductive coupling between the rotor 15 and the windings takes place to cause rotation of the rotor 15 when alternating current power is applied to the windings 13 and 14.

In the lowermost position of the three position switch 20, 22, 23, 24, shown in FIG. 1, the moveable contact 20 engages the contact 22 of the switch. This is the "off" position of the switch, and no power is applied to any of the windings of the motor in this position. The switch 20 is capable of movement from the position 22 counter-clockwise to the positions 23 and 24, and then back to the position 22, in sequence, as illustrated.

When the switch 20 is moved to the contact point 23, the motor is interconnected for its high speed mode of operation as described above. The wire size of the winding 13 is large compared to that of a second "run" winding 14. Typically, the wire 13 is wound with No. 16 or No. 17 wire, while the wire size of the winding 14 is No. 18 or No. 20 wire. The capacitace of the capacitor 17, is approximately 80 microfarads. The motor with the switch interconnecting the moveable contact 20 with the contact 23, is configured as series resonant capacitor motor having the characteristics of the motors disclosed in U.S. Pat. No. 4,794,288.

During the operation of the motor from start through no-load and/or full-load conditions, the capacitor 17 in series with the winding 13 forms a series resonant circuit, the resonance of which is selected to be at or near the 60 Hz frequency of the power supply 9. Obviously, if power supplies of different frequencies, such as 50 Hz or 120 Hz are used, the resonance of the series resonant circuit consisting of the winding section 13 and the capacitor 17 is selected to match the frequency of the particular alternating frequency source 9. The capacitor 17 is an alternating current non-polarized capacitor and may be an electrolytic capacitor, a metallized foil capacitor, or a metallized polypropylene capacitor.

At start-up, the motor of FIG. 1 causes a substantial portion of the total current to flow through the winding 14. This current, however, rapidly drops to a low current, with essentially all of the operating current flowing through the run winding section 13. This shift of the current flow occurs auto matically as a result of the characteristics of the series resonant circuit, so that the winding 14 may be made of relatively small diameter wire. This winding obviously functions as a start winding as a result.

There is little or no danger of burnout of the winding 14, since it never carries any high current for any prolonged period of time. In fact, during normal run operation of the motor, the start winding 14 could be switched entirely out of the circuit if desired. This is not necessary, however, since the current through the winding 14 automatically drops to a low current (approximately 25% to 50% of the current in the winding 13) due to the inherent operating characteristics of the motor. The three-position switch in the position shown, with the contacts 20 and 23 interconnected, causes the motor of FIG. 1 to operate in its high-speed, high-torque mode of operation. In this mode, at full load, the currents in the windings 13 and 14 are electrically dephased or out of phase by 90°.

When the moveable contact of the switch 20 is moved to the next counterclockwise position, it interconnects the contact 24 with the primary on/off switch 10/12. In this position of operation, it is readily apparent that the winding 14 and the series connected winding 13 and capacitor 17 are disconnected from the power supply 9. At the same time, however, a third run winding 25 is connected in series across the power supply 9. The number of turns of the winding 25 is selected to provide a desired low speed operation of the motor from the power supply 9. The wire size of the winding 25 is a relatively smaller wire size comparable to the wire size of the winding section 13.

When the winding 13 and capacitor 17 are switched out of the circuit, the capacitor 17 discharges through a relatively large power dissipating resistor 18, in the manner described in U.S. Pat. Nos. 4,794,288 and 4,734,601, to prevent discharge of the capacitor 17 through the winding 13. Consequently, no noise or chattering of the rotor 15 takes place when the high speed winding sections 13 and 14 are disconnected from the power supply. To turn the motor off, the switch moveable contact 20 is rotated further counterclockwise to again engage the contact 22, thereby disconnecting all of the windings from the power supply 9.

The switch 20, 22, 23, 24, is located externally of the motor, so it is not subject to the operating environment of the windings 13, 14, and 25.

Figure 2:
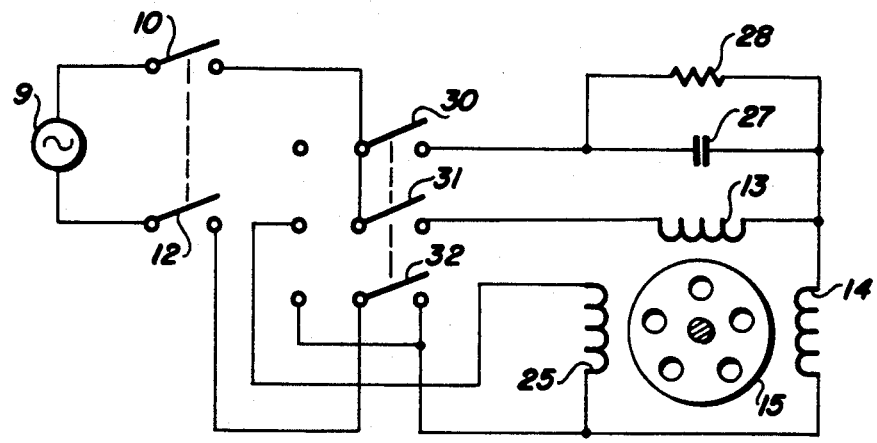

Reference now should be made to FIG. 2, which also discloses a two-speed motor utilizing many of the same operating characteristics which have been described above in conjunction with the motor of FIG. 1. The motor of FIG. 2, however, is directed to a parallel resonant, single-phase motor of the general type disclosed in U.S. Pat. No. 4,772,814. Reference should be made to that patent for a description of the operating characteristics of this motor. The parallel resonant motor of FIG. 2, however, has been modified so that it operates as a parallel resonant motor in the high speed mode of operation only. It operates with a separate low speed run winding in the same manner as described in conjunction with the embodiment of FIG. 1 when it is switched to the low speed mode of operation.

The speed selection switch of the motor of FIG. 2 is a three-pole double-throw switch comprising interconnected contact arms 30 and 31, which are connected to the switch contact 10, and a third contact arm 32, which is connected to the contact 12 of the switch 10/12. When the switch 30, 31, 32, is operated to the right-hand position shown in FIG. 2, the motor is operated in its high speed mode. The windings 13 and 14 are connected in series with one another across the power supply 9 through the switch 10/12 to rotate the rotor 15 of the motor. A capacitor 27 is connected in parallel with the winding 13 and forms a parallel resonant circuit with the winding 13 at the operating frequency of the motor. A power dissipating resistor 28 is connected across the capacitor 27 and functions in a manner comparable to the function of the resistor 18, described in conjunction with FIG. 1. So long as the switch 30, 31, 32, is in the right-hand position shown in FIG. 2, the motor operates in its high speed mode of operation with operating characteristics of the type described in U.S. Pat. No. 4,772,814.

When it is desired to operate the motor of FIG. 2 in its low speed mode of operation, the switch 30, 31, 32, is switched to the left-hand position. In this position, the windings 13 and 14, and the capacitor 27 are disconnected from the circuit. A low speed run winding 25, however, then is connected across the power supply 9 through the switch 10/12 and by means of the contacts 31 and 32 to continue operation of the motor. The operation in this low speed mode is identical to that described in conjunction with the embodiment of FIG. 1 when that motor is operated in its low speed mode of operation.

Figure 3:
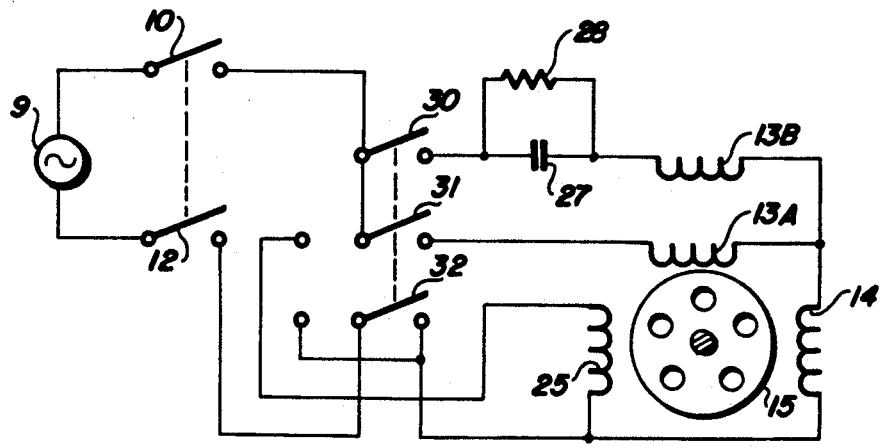

FIG. 3 is another variation of a parallel resonant motor similar to the one of FIG. 2. The motor of FIG. 3, however, employs a split winding 13A, 13B in place of the single start winding 13 of the motor of FIG. 2. A capacitor 27 is connected in series with the winding 13B and this series circuit in turn is connected in parallel with the winding 13A when the switch 30, 31 is closed to the right-hand position shown in FIG. 3. The circuit including the winding 13B and capacitor 27 is in parallel resonance with the winding 13A at the operating frequency of the motor. In all other respects, the embodiment of FIG. 3 operates in the same manner as that of FIG. 2. In the low speed operation of the motor, the winding 25 is energized and the windings 13A, 13B and 14 are disconnected from the circuit. The interconnections of the switch 30, 31, and 32, are the same as used for the circuit of FIG. 2.

It should be noted that the switch 30, 31, 32, of FIGS. 2 and 3 is located externally of the motor. Normal operation of the motor is such that the rest position of the switch 30, 31, and 32, of the motors of FIGS. 2 and 3, after the motor has been turned off by opening the switch 10/12, is to the right-hand position. Consequently, when the switch 10/12 next is turned on, the motors of FIGS. 2 and 3 start operation in the high speed mode. This ensures that overheating of the low speed coil 25 does not occur. This also provides maximum starting torque for the motor. The manner in which the switch 30, 31, and 32 reverts to its right-hand position after opening of the switch 10/12 is not shown, but this may be effected in any of a number of conventional readily available techniques. The switch is a standard three-pole, double-throw switch having this characteristic.

Figure 4:
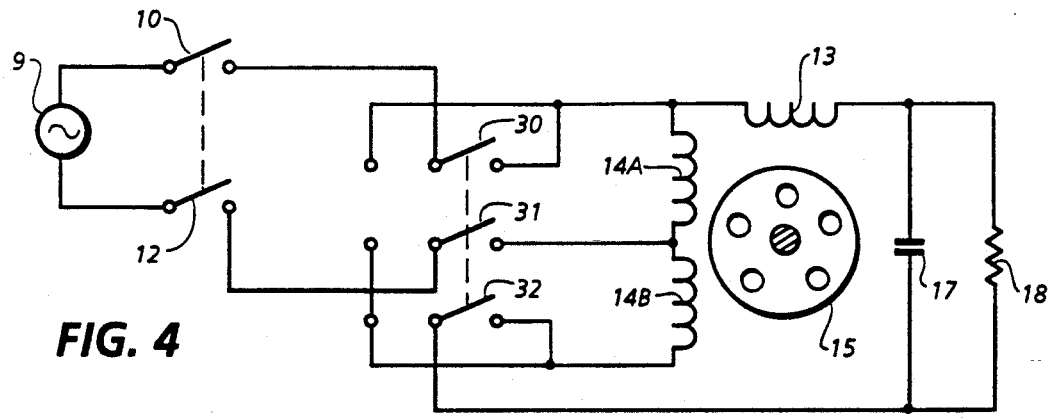
Figure 5:
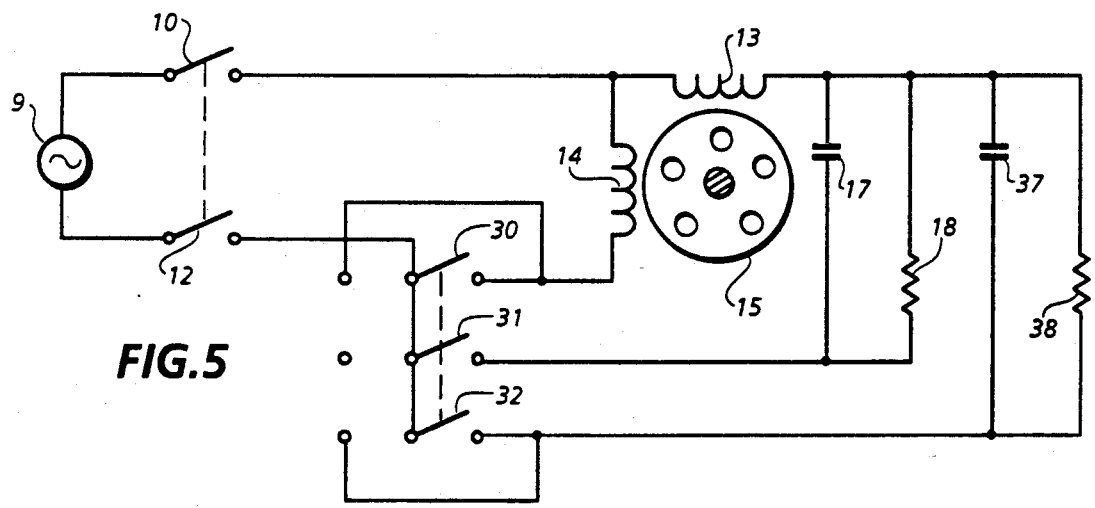
Figure 6:
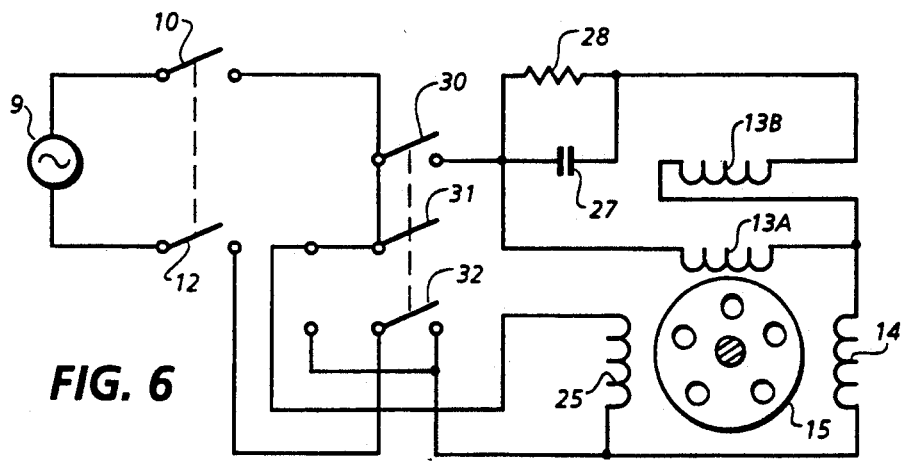

FIGS. 4, 5, and 6, all are variations of series resonant capacitor motors of the general type disclosed in FIG. 1. Each of the motors of these three different circuits, however, has operating characteristics which differ somewhat from those of the motor of FIG. 1. The motor of FIG. 4 employs a split start winding 14A, 14B, and utilizes a large wire size (No. 17) for the windings 13 and 14B and a small wire size (No. 22) for the winding 14A.

In place of the three-position rotary switch shown in FIG. 1, the speed selection switch illustrated in FIGS. 4, 5, and 6, is a three-pole, double-throw switch similar to the one used in the embodiments of FIGS. 2 and 3. The wiring interconnections of the various poles of the switch, however, differ from those shown in FIGS. 2 and 3. In FIG. 4, the moveable contact 30 of the three-pole switch is connected to the contact 10 of the on/off switch 10/12. Similarly, the moveable contact 31 of the three-pole switch is connected to the contact 12 of the on/off switch. The moveable contact 32 of the three-pole switch is connected to the capacitor 17. Consequently, in the right-hand position of the motor, current flows through the contact 30, the winding 13, the series resonant capacitor 17, the contact 32, and the winding 14B (in the upward direction shown in FIG. 4), and through the contact 31 back to the switch 12. In addition, a parallel circuit path is provided in the downward direction (as viewed in FIG. 4) through the winding section 14A. Thus, current flow through the winding sections 14A and 14B in the high speed mode of operation of the motor is in opposite directions.

The purpose of using opposite current flow through the winding sections 14A and 14B, is to employ a transformer effect to produce a counter-electromotive force secondary induction voltage into the circuit of the run winding 13 and the capacitor 17 of the motor of FIG. 4. This generates a high voltage vectorially and across the capacitor 17, thereby increasing the voltage of the capacitor 17, so that the size of the capacitor is smaller than would otherwise be required. The winding 14B of FIG. 4 effectively replaces a reactor transformer for the purpose of increasing the capacitor voltage of the capacitor 17.

When the motor of FIG. 4 is to be operated in the low speed mode, the three-pole switch is operated to its left position. This position does not change the current flowing through the series resonant circuit consisting of the winding 13 and the capacitor 17. This position, however, does cause the two winding sections 14A and 14B to be connected in electrical series with one another and in parallel with the series-connected capacitor 17 and winding 13 across the power supply 9. The turns ratios of the windings 13, 14A and 14B are selected to provide the desired high and low speeds of operation of the motor. As with the motors described above in conjunction with FIGS. 1, 2 and 3, the switch 30, 31, 32, is located externally of the motor.

Figure 4A:
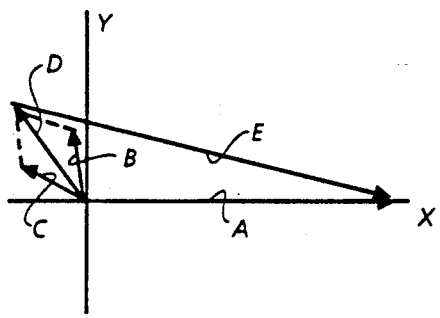
FIG. 4A is a vector diagram of the voltages occurring across the various ones of the components shown in FIG. 4 at the start-up condition of operation.

FIG. 4A is a vector diagram of the voltages occurring across various ones of the components of the circuit of FIG. 4 at the start-up condition of operation. When power initially is applied to the motor at start-up, the line voltage is applied across the winding section 14A, and is illustrated by vector A in FIG. 4A. This vector coincides with the positive "X" axis of the vector diagram, and is substantially the full line voltage, approximately 230 volts. At the same time, because of the transformer effect which takes place in the circuit, the voltage vector B across the winding 13 is out of phase with the voltage vector across the winding 14A, and is in the negative quadrant of the vector diagram. Similarly, the voltage across the winding 14B is shown in vector C of the diagram of FIG. 4A. The composite of these vectors, B and C, produces the resultant vector D to establish the starting point of the voltage across the capacitor 17, as illustrated in the vector E. An examination of FIG. 4A clearly shows that the voltage across the capacitor 17 is substantially more than the line voltage applied across the winding 14A. This effect is produced in the manner described above, in the description of FIG. 4.

FIG. 5 is directed to a series capacitor motor which is a variation of the motor shown in FIG. 4. A single winding 14, however, is used in place of the split-winding of FIG. 4. In addition, a second capacitor 37 is connected in parallel with the capacitor 17 when the motor is operated in its high-speed mode of operation. The capacitor 37 comprises the sole series resonant capacitor for the motor when it is operated in its low-speed mode of operation. In the motor of FIG. 5, all three of the moveable contacts 30, 31, and 32 of the three-pole double-throw switch are interconnected in common to the terminal 12 of the on/off switch 10/12. The terminal 10 of the switch is connected to the junction of the windings 13 and 14 of the motor. Consequently, when the three-pole switch is operated to the right-hand position shown in FIG. 5, the capacitors 17 and 37 are in parallel with one another and in series with the winding 13. The winding 14 then is connected in parallel with the circuit comprising the winding 13 and the capacitors 17 and 37. In the high-speed mode of operation, at both start and run, the two capacitors 17 and 37 are connected in parallel to enable the motor to develop high starting torque and low current. During the high-speed mode of operation from start to operating frequency, this circuit remains.

At low speed, the three-pole double-throw switch 30, 31, 32, is moved to the left-hand position shown in FIG. 5. The winding 4 continues to be supplied with power, as when the switch is in the right-hand position. Similarly, the series resonant circuit, consisting of the winding 13 and the capacitor 37, remains in the circuit. The capacitor 17, however, has been disconnected from the circuit and discharges through the high impedance discharge resistance 18 when the switch is moved from the right-hand position to the left-hand position.

When the capacitor 17 is removed from the circuit for low speed operation, the current in the windings 13 and 14 is reduced; and the motor develops a high impedance in the circuit which produces a high resistance rotor slip to permit variable speed operation of the motor. The circuit of FIG. 5 employs a variable capacitance to change the impedance (increase it) at low speed when the motor is under its load condition of operation. It is necessary for this motor to be loaded to vary the speed from its high speed mode of operation to a low speed mode.

The motor shown in FIG. 6 also is directed to a two-speed parallel capacitor motor, which is a variation of the motor shown in FIG. 3. As with the motor of FIG. 3, the motor of FIG. 6 employs a split winding 13A, 13B in place of a single start winding 13. The split winding section, however, has the two winding portions electrically connected in series, with the capacitor 27 connected in series with the winding 13B. This series circuit in turn is connected in parallel with the winding 13A when the switch 30 is closed to the right-hand position shown in FIG. 6. The motor of FIG. 6 otherwise operates in a manner similar to the operation of the motor of FIG. 3, but a high voltage, small-size capacitor 27 is used in the parallel resonant circuit.

Figure 7:
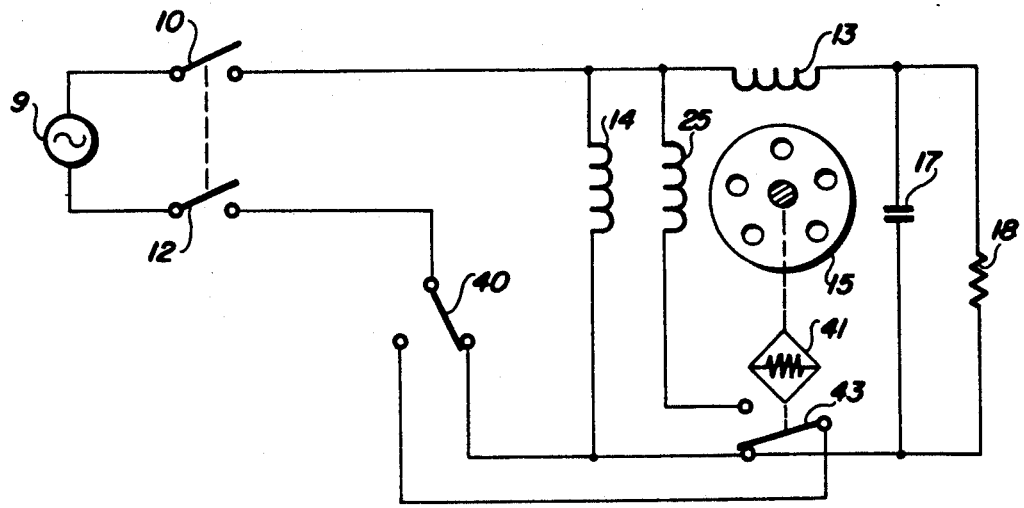
Figure 8:
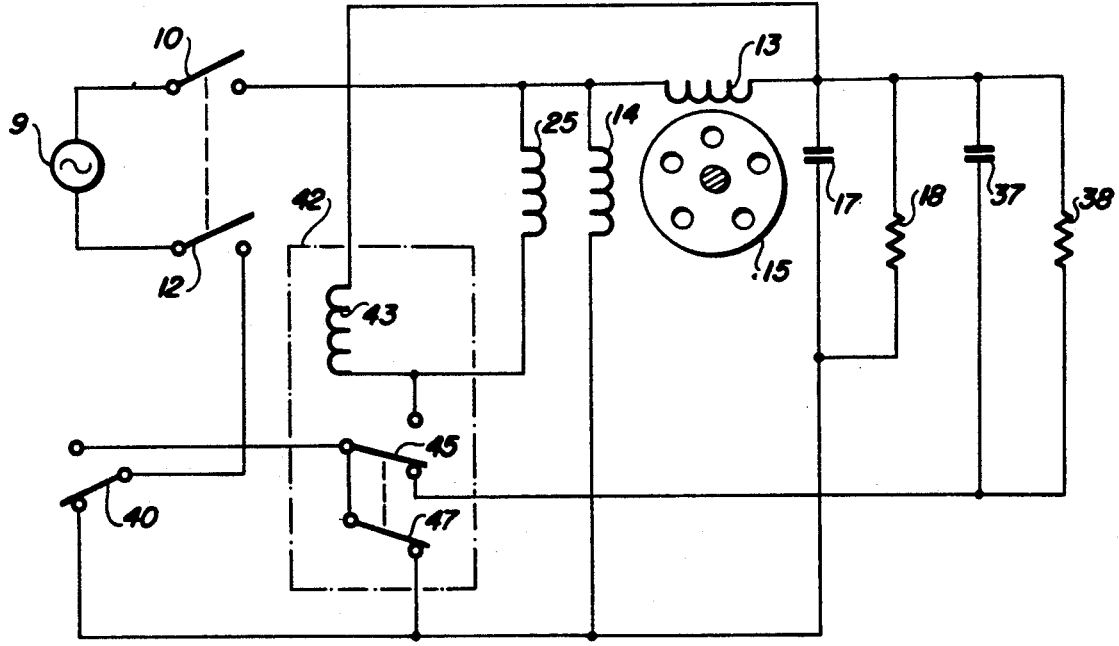

FIGS. 7 and 8 are directed to variations of a motor using a speed responsive switch which performs two functions. First, irrespective of whether the speed control switch 40 is in its high speed or low speed position when power is first applied through the switch 10/12, the motors of FIGS. 7 and 8 always start in the high-speed mode of operation. If the control switch 40 is in its low-speed (left-hand) position, the motor automatically drops back to its low speed mode of operation once a predetermined rotational speed of the rotor 15 is attained. Conversely, if the speed selection switch 40 is in the high-speed (right-hand) position at motor start-up when the power supply switch 10/12 is closed, it continues to operate in the high-speed mode of operation; and the speed responsive switch has no affect on the motor operation. In all other respects, the motors of FIGS. 7 and 8 operate in a manner identical to the operation of the motor described in conjunction with FIG. 1. Both of these motors are series resonant motors. The motor of FIG. 8 also includes a separate capacitor start circuit for improving the starting torque of the motor.

Reference now should be made to FIG. 7. The components of the motor of FIG. 7 which differ from those of the motor of FIG. 1 include a centrifugal switch having an operator 41 and a moveable contact 43. In addition, the switch 20 of FIG. 1 has been replaced by a single-pole double-throw switch 40. When the switch 40 is in the position shown in FIG. 7, the motor is in its high speed mode of operation. At start-up, the moveable contact 43 of the centrifugal switch 41, 43 is in the lower position, as illustrated in FIG. 7. Thus, when power is applied to the motor by closure of the switch 10/12, the initial starting conditions are identical to those described previously for the high speed mode of operation of the circuit of FIG. 1. When a predetermined operating speed of the motor has been attained, the centrifugal switch 41 moves the contact 43 from the lower position to the upper position to interconnect the winding 25 with the left-hand or low speed terminal of the switch 40. So long as the switch 40, however, is in the right-hand position, as shown in FIG. 7, this operation has no affect whatsoever on the motor operation. The high speed mode continues, so long as the switch 40 remains in the right-hand position.

If, however, after attaining a speed which is greater than the preestablished speed for operation of the switch 40/43, the switch 40 is moved to the left-hand position, the winding 25 is energized from the switch 10/12 in the same manner as described in conjunction with the circuit of FIG. 1 when the switch contactor 20 is moved to the contact 24 of the circuit shown in FIG. 1. In this condition of operation, the low speed winding 25 is supplied with operating power, but no current flow takes place through the windings 13 and 14.

Now assume that the switch 40 of FIG. 7 is in the left-hand position at motor start-up. When power is applied through the on/off terminals 10/12 from the source of power 9, no current flows through the winding 25 since the moveable contact 43 is in the position shown in FIG. 7. Current, however, does flow through the windings 13 and 14 and the capacitor 17 connected in series with the winding 13 through the contact 43. Thus, the same conditions of operation which are established for start-up in the high speed mode of operation of the motor of FIG. 7 also are present when the switch 40 is switched to the left (the low speed side) at start-up. When the preestablished operating speed for operating the centrifugal switch 41/43, however, is attained, movement of the contact 43 from the lower position to the upper position interconnects the run winding 25 with the power source; but the windings 13 and 14 then are disconnected since there is no circuit connection made between these windings and the switch 40 in the left-hand position.

Consequently, the motor of FIG. 7 provides an added degree of protection against overheating of the low speed winding 25 which is not present in the circuit of FIG. 1. If the motor of FIG. 1 is started in the low speed position, current flow passes through the low speed winding 25 during the start-up condition of operation. For the circuit of FIG. 1 this can lead to overheating of the winding 25. That is the reason the switch 20 of FIG. 1 also is used as the primary switch for turning off the motor rather than the main power supply switch 10/12. With the circuit of FIG. 7, it is not possible to start the motor through the run winding 25, since the motor always starts in the high speed mode of operation, irrespective of the position of the switch 40.

The circuit of FIG. 8 is similar to that of FIG. 7, but instead of using a centrifugal switch 41/43, a voltage responsive switch 42 is employed. The voltage through the operating coil 43 of this switch is used to move a pair of interconnected moveable contacts 45 and 47 from a lower position to an upper position when a predetermined operating speed of the rotor 15 of the motor is attained. The operation of the voltage responsive relay 42 is the same as the operation of the centrifugal switch 41/43 of the circuit of FIG. 7, so far as the results obtained are concerned. The insurance against starting the motor with power applied only through the low speed run winding 25 is provided by the circuit of FIG. 8 in the same manner as the circuit of FIG. 7.

In addition, the circuit of FIG. 8 also includes a separate capacitor start circuit, comprising the capacitor 37 and the high impedance discharge resistor 38. This circuit operates in the same manner as the circuit discribed in conjunction with FIG. 5 for the same purposes. The capacitor 37 is in the circuit at start-up, irrespective of the position of the switch 40. Once the desired operating speed of the motor has been attained, the capacitor 37 is switched out of the circuit by movement of the moveable contact 45 from the lower position shown in FIG. 8 to the upper position. The motor of FIG. 8 otherwise operates in the same manner as the motor of FIG. 7.

FIG. 9 illustrates another example of a three-speed, series resonant motor using a rotary switch of the type employed with the embodiment of FIG. 1. The motor of FIG. 9, however, is capable of being started in any of its three operating speeds, and produces high starting torque as a result of the series resonant circuit produced by the run winding 13 and the capacitor 17. The motor also must be loaded at all times for proper operation in a manner comparable to the operation of known DC series wound motors.

In addition to the run winding 13, which always is in the operating circuit for the motor, from start-up though selected run speed, three start windings, 54, 55, and 56, are provided for the corresponding running speed. The highest speed is obtained by connecting the rotary switch 50 with the contact 53, placing the winding 54 in parallel with the winding 13 and capacitor 17. When the middle position of the three-position switch 50 is selected by connecting the movable switch arm to the medium speed terminal 52, a pair of windings 54 and 55 comprise a series connected winding in parallel with the winding 13 and capacitor 17. Finally, when the movable switch is moved to contact the low speed terminal 51, three windings, 54, 55, and 56, are connected in series with one another, and in parallel with the winding 13 and capacitor 17.

The winding 13, in conjunction with the capacitor 17, forms a series resonant circuit throughout the operation of the motor through its start-up condition, as well as full load operating conditions, any one of the three speeds which may be selected by the movable contact 50. The wire size of the winding 13 is the largest wire size, and, typically, is No. 16 or No. 17 wire. The winding 54 also is a relatively large size winding, equal in size to the wire of the winding 13, or slightly smaller. The wire size used for the winding 55 is somewhat smaller than that used in the winding 54, and, typically, is No. 18 or No. 20 wire. Finally, the wire size of the winding 56 is still smaller than the size of the winding 55, to further reduce the speed of the motor and increase impedence of the starting winding circuit consisting of all three windings, 54, 55, and 56, when the switch 50 selects the terminal 51.

It is apparent from consideration of the manner in which the windings 54, 55, and 56 are arranged, that the impedance of the composite start winding comprising one, two or all three of these windings has an increasing impedance (for decreasing motor speed), depending upon the number of windings which are connected in series together to form the start winding of the circuit. This impedance is effected to cause the operating current to be correspondingly reduced when the motor is operating at lower speeds to prevent motor burn-out, irrespective of the speed of operation, or the position of the speed selection switch at motor start-up.

As in the case of the circuit of FIG. 1, the switch 50 is employed as a primary on-off switch, and can be moved to the off position, either from the highest speed operating position or the lowest speed operating position. If, however, a position of the low speed (terminal 51) or the intermediate or medium speed (terminal 52), is selected by the switch 50 prior to closure of the switch contacts 10 and 12, the motor still is capable of high torque, reduced current starting without the danger of excess current flowing through the start windings 54, 55, or 56, or any combination of them. This current limitation further is effected by the series resonant circuit 13/17.

FIG. 10 illustrates a variation of the invention for a six-speed variable horsepower, variable torque motor employing the principles of the invention in conjunction with a series resonant motor. Once again, those circuit components which are common to the embodiment shown in FIG. 1 are provided with the same reference numbers in FIG. 10. FIG. 10, however, utilizes two start windings 64 and 65 in conjunction with a three-pole, double-throw switch 60, 61, 62 to select either a high speed range (right) or a low speed range (left) of operation of the motor. Within the speed ranges selected by the switch 60, 61, 62, a double-pole, double-throw switch, comprising movable contacts 74 and 75, is employed to select three different combinations of capacitors for providing the series resonance with the run winding 13 at the selected operating speeds.

By changing the resonance of the circuit including the winding 13, three different operating speeds within each of the speed ranges selected by the switches 60, 61, and 62 are possible. It is to be noted that when the switch contacts, 60, 61, and 62, are closed to the right-hand position, the two start windings, 64 and 65, are connected in parallel with one another, and this parallel combination, in turn, is connected in parallel with the winding 13 and the selected combination of capacitors 17, 67, or 77, as selected by the switch 74, 75. This is the high speed range of the motor. When the switch 60, 61, 62 is moved to its left-hand position, the windings 64 and 65 are connected in series with one another across the input terminals of the motor for the low speed range of operation.

Within the two speed ranges selected by the left-hand or right-hand positions of the switch 60, 61, 62, the position of the double-pole, double-throw switch 74, 75 selects the desired speed. When the switch 74, 75 is moved to its left-most position, as illustrated, all three capacitors 17, 67, and 77, are connected in parallel with one another, and this parallel combination then is connected in series with the winding 13 to provide the capacitance for the desired resonant circuit. This is the high-speed operation of the selected range provided by the switches 60, 61, and 62. When the switches 74, 75 are in the open position, as shown in solid lines in FIG. 10, the lowest speed of operation of the motor within the range selected by the switches 60, 61, 62 is provided. In this lowest speed range of operation, only the capacitor 17 is connected in series with the winding 13 to form the series resonant circuit. In the right-hand position of the switches 74, 75, the capacitors 17 and 77 are connected in parallel with one another; and this parallel combination then forms the series-resonant circuit with the winding 13. This is the medium speed or intermediate speed of operation of the motor within the selected low or high speed range.

All of the six different combinations of speed operation attainable by the motor of FIG. 10, are illustrated in FIG. 11, which provides all of the electrical characteristics for the motor, both at start and at run. The specific motor which produces these operating characteristics was wound in accordance with the circuit arrangement shown in FIG. 10. The motor selected was a conventional Dayton one-half horsepower, direct-drive fan motor, Model 5K401A, Part No. 5600DPH-4623, 115 Volts, 6.6 Amperes, 1725 RPM, 56 Frame, Lock Rotor Amperes 32, 40° C. rise. The motor windings were replaced with the run winding 13, and the two start windings 64 and 65, with the run winding 13 using No. 16 or No. 17 wire, and the windings 64 and 65 using smaller wire, No. 18 or No. 20. The readings of FIG. 11 are accurate to approximately 2% or 3%.

This motor is constantly loaded at all times, and can be started in any of its operating speeds without danger of burn-out of either of the windings 64 and 65. The primary current is carried by the series resonant winding 13, and by proper interrelationship of the operation of the two different banks of selection switches which have been described above, the various speeds of operation which are shown in FIG. 11 are readily attained. This motor is particularly suitable for applications such as blowers, ventilating fans or exhaust fans where variable air circulation is required. Other applications requiring multiple ranges of motor speed operation with high torque and high efficiency at all speeds, also readily are fulfilled by the motor of FIG. 10.

It should be noted that both of the switches 60, 61, 62, and 74, 75, are located externally of the motor, and that no thermally operated switch or centrifugally operated switch is required to protect the start windings 64 and 65, as is the case with conventional multi-speed motors. The series-resonant circuit limits the current through these windings.

The various preferred embodiments of the invention which are shown in the drawings and which have been described above are to be considered illustrative of the invention and not as limiting. Various changes and modifications may be made to those embodiments by those skilled in the art without departing from the true scope of the invention. For example, only a limited number of winding configurations and starting switch circuits have been illustrated. Others may be employed. The invention is intended to cover such modifications without departing from the scope of the invention as set forth in the appended claims.

I claim:

1. A high efficiency multiple speed alternating current motor for operation from a source of single phase alternating current power including in combination:
   a stator core;
   a rotor;
   first conductor winding means including a first conductor winding;
   first capacitor means connected in series circuit with said first conductor winding and having a sufficiently high capacitance to form a resonant series circuit at the frequency of alternating current power from the source of alternating current power;
   second conductor winding means comprising at least a second conductor winding and a third conductor winding, connected in parallel with said series circuit of said first conductor winding and said first capacitor means, said first and said second conductor winding means being electrically angularly displaced from one another substantially 90° on said stator core and inductively coupled to said rotor;
   first switch means, having at least first and second states of operation, located externally of said motor and coupled between the source of power and at least said second conductor winding means for changing the impedance of said second conductor winding means, said first switch means in said first state of operation interconnecting said second conductor winding means and said series circuit in parallel with one another to the source of alternating current power, and said first switch means in said second state of operation interconnecting said third conductor winding to the source of alternating current power.

2. The combination according to claim 1 wherein the size of the wire of said second winding means is equal to or less than the size of the wire for said first winding.

3. The combination according to claim 1 wherein the impedance values of the circuit elements of said motor are such that the current through said first conductor winding is substantially greater than the current through said second conductor winding means when said first switch means is in said first state of operation.

4. A multiple speed alternating current motor for operation from a source of single phase alternating current power including in combination:
   a stator core;
   a rotor;
   first conductor winding means including a first conductor winding;
   first capacitor means connected in series circuit with said first conductor winding to form a resonant series circuit at the frequency of alternating current power from the source of alternating current power;
   second conductor winding means comprising at least a second conductor winding and a third conductor winding, connected in parallel with said series circuit of said first conductor winding and said first capacitor means, said first and said second conductor winding means being electrically angularly displaced from one another substantially 90° on said stator core and inductively coupled to said rotor;
   first switch means, having at least first and second states of operation, coupled between the source of power and at least said second conductor winding means for changing the impedance of said second conductor winding means, said first switch means in said first state of operation interconnecting said second conductor winding means and said series circuit in parallel with one another to the source of alternating current power, and said first switch means in said second state of operation interconnecting said third conductor winding to the source of alternating current power and said second conductor winding means including a fourth conductor winding, and said first switch means having at least first, second, and third states of operation, with operation of said first switch means to said third state of operation connecting said second, third, and fourth conductor windings in series with one another and in parallel across said series circuit.

5. The combination according to claim 4 wherein the size of the wire of said second winding is equal to or less than the size of the wire for said first winding, the size of the wire for said third winding is less than the size of the wire for said second winding, and the size of the wire of said fourth winding is less than the size of the wire for said third winding.

6. The combination according to claim 5 further including means coupled with said capacitor means for changing the effective capacitance thereof, to vary the speed of said motor under load conditions of operation.

7. The combination according to claim 1 further including means coupled with said capacitor means for changing the effective capacitance thereof, to vary the speed of said motor under load conditions of operation.

* * * * *